United States Patent [19]

Huang

[11] Patent Number: 4,725,929

[45] Date of Patent: Feb. 16, 1988

[54] AUXILIARY LIGHT FOR VEHICLES

[76] Inventor: Rong C. Huang, 29-26, Che Lu Chien, Pao An Villa, Jen Te Hsian, Tainan Hsieh, Taiwan

[21] Appl. No.: 32,467

[22] Filed: Mar. 31, 1987

[51] Int. Cl.⁴ .......................... B60Q 1/18; B60Q 1/20
[52] U.S. Cl. ..................................... 362/80; 362/226; 362/268; 362/293
[58] Field of Search ................. 362/80, 226, 268, 293, 362/310

[56] References Cited

U.S. PATENT DOCUMENTS

| | | | |
|---|---|---|---|
| 2,668,903 | 2/1954 | Barcus | 362/293 |
| 2,734,129 | 2/1956 | Kahla | 362/293 |
| 2,807,711 | 9/1957 | McDonald | 362/293 |
| 3,696,238 | 10/1972 | Szymanski | 362/293 |
| 3,843,878 | 10/1974 | Ueda et al. | 362/293 |
| 4,222,092 | 9/1980 | Bray | 362/80 |
| 4,425,607 | 1/1984 | Shanks | 362/310 |
| 4,439,817 | 3/1984 | Aton | 362/310 |
| 4,575,782 | 3/1986 | Levine et al. | 362/368 |
| 4,663,696 | 5/1987 | Miyazawa et al. | 362/80 |

Primary Examiner—George L. Walton
Attorney, Agent, or Firm—Lowe, Price, LeBlanc, Becker & Shur

[57] ABSTRACT

This invention relates to an auxiliary light for vehicles and in particular to one including a housing having a generally rectangular open end, a mounting having a bottom plate adapted to be received in the housing, a bulb mounted on a conducting rectangular stand, a holder formed of the rear portion with two prongs separated by a distance wider than a narrower side of the stand, a light concentrator for concentrating the light from the bulb to the reflective wall of the housing, a rubber seal disposed in the housing for preventing water from entering therein, a transparent shade fitted into the housing, a frame engaged with the open end of the housing and a movable colored cover pivotally mounted on the frame, whereby the invention can be easily assembled without using screws, rivets or any other tools and can be used as both an auxiliary light and a fog light.

1 Claim, 11 Drawing Figures

AUXILIARY LIGHT FOR VEHICLES

BACKGROUND OF THE INVENTION

With reference to FIGS. 10 and 11, there is shown a prior art fog light. As illustrated, the spherical housing 91 is provided with a center hole 911 having a number of protuberances 912 on its circumference. The center hole 911 is designed to receive a holder 92 which has a recess 921 for accommodating a bulb 93. On the circumference of the holder 92 there are two through holes 922 in which a resilient member is mounted. The holder further has a flange 923 formed with a number of holes 924 adapted to the protuberances 912 of the housing. By means of the resilient member 94 disposed between the two holes 922, the bulb 93 can be firmly mounted into the holder 92. The holder 92 is kept in position by twisting the protuberances 912 through an angle of 90 degrees. The glass shade 95 is put into the housing 91 and kept in place by a frame 96 which is fixed on the housing 91 by screws 97.

However, it should be noted that screws and rivets are necessary for the assembly of such fog light and so it is inefficient and time-consuming in production. Furthermore, such kind of fog light cannot be used as an auxilliary light.

It is, therefore, an object of the present invention to provide an auxiliary light for vehicles which may obviate and mitigate the above-mentioned drawbacks.

SUMMARY OF THE INVENTION

This invention relates to an auxiliary light for vehicles.

It is the primary of the present invention to provide an auxiliary light for vehicles which can be easily assembled without using screws, rivets or any other tools.

It is another object of the present invention to provide an auxiliary light for vehicles which can also be used as a fog light.

It is still another object of the present invention to provide an auxiliary light for vehicles which is simple in construction.

It is still another object of the present invention to provide an auxiliary light for vehicles which is inexpensive to produce.

It is a further object of the present invention to provide an auxiliary light for vehicles which is facile to manufacture.

The novel features which are characteristics of the invention, together with further objects and advantages thereof will be better understood from the following description considered in connection with the accompanied drawings and in which a preferred embodiment of the invention is illustrated by way of example. It is to be expressly understood, however, that the drawings are for the purpose of illustration and description only and are not intended as a definition of the limits of the invention.

DETAILED DESCRIPTION OF THE PREFERRED EMBODIMENT

Figures 1, 2:
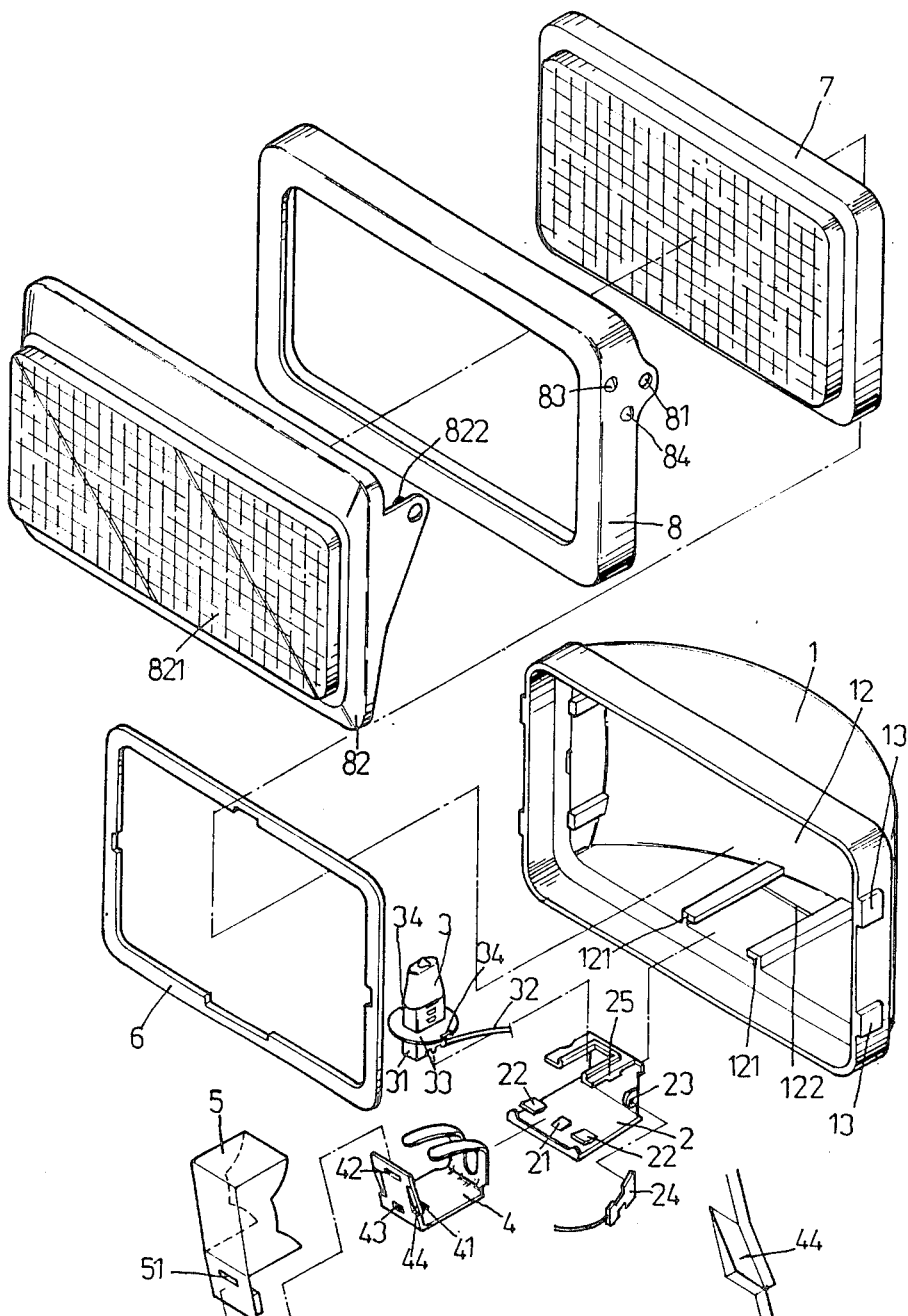
FIG. 1 is an exploded view of the present invention.
FIG. 2 is a fragmentary view of the holder.
Figure 3:
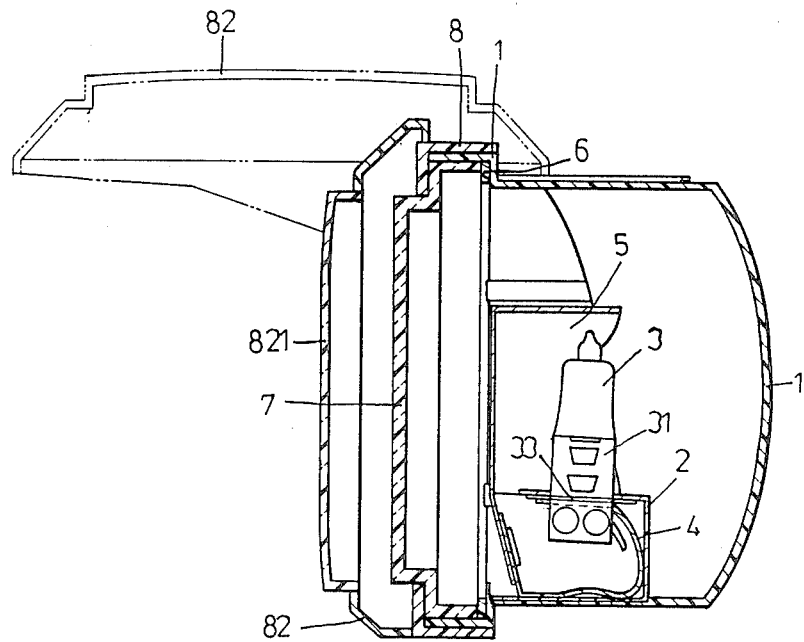
FIG. 3 is a sectional view of the present invention.
Figures 4, 5, 6:
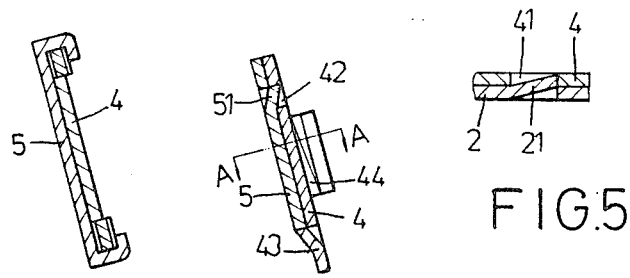
FIG. 4 is a sectional fragmentary view showing the engagement between the light concentrator and the holder.
FIG. 5 is a sectional fragmentary view showing the engagement between the mounting and the holder.
FIG. 6 is a sectional view taken along line A—A of FIG. 4.
Figure 7:
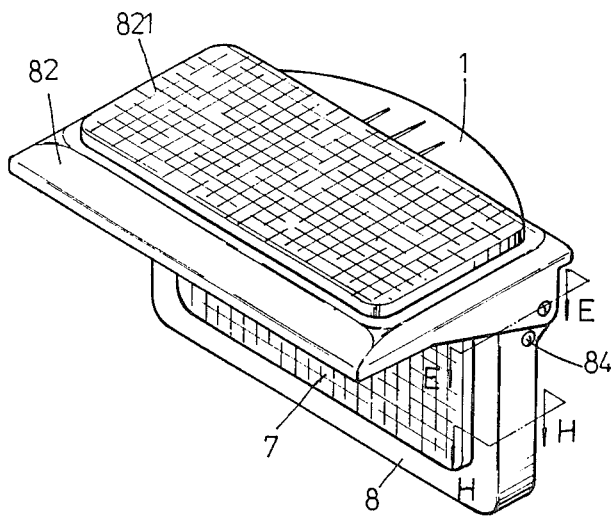
FIG. 7 is a perspective view of the present invention.
Figure 8:
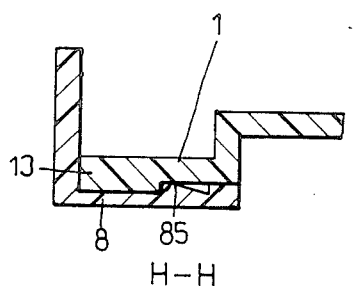
FIG. 8 is a sectional fragmentary view taken along line H—H of FIG. 7.
Figure 9:
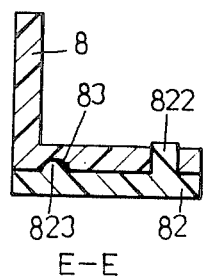
FIG. 9 is a sectional fragmentary view taken along line E—E of FIG. 7.
Figure 10:
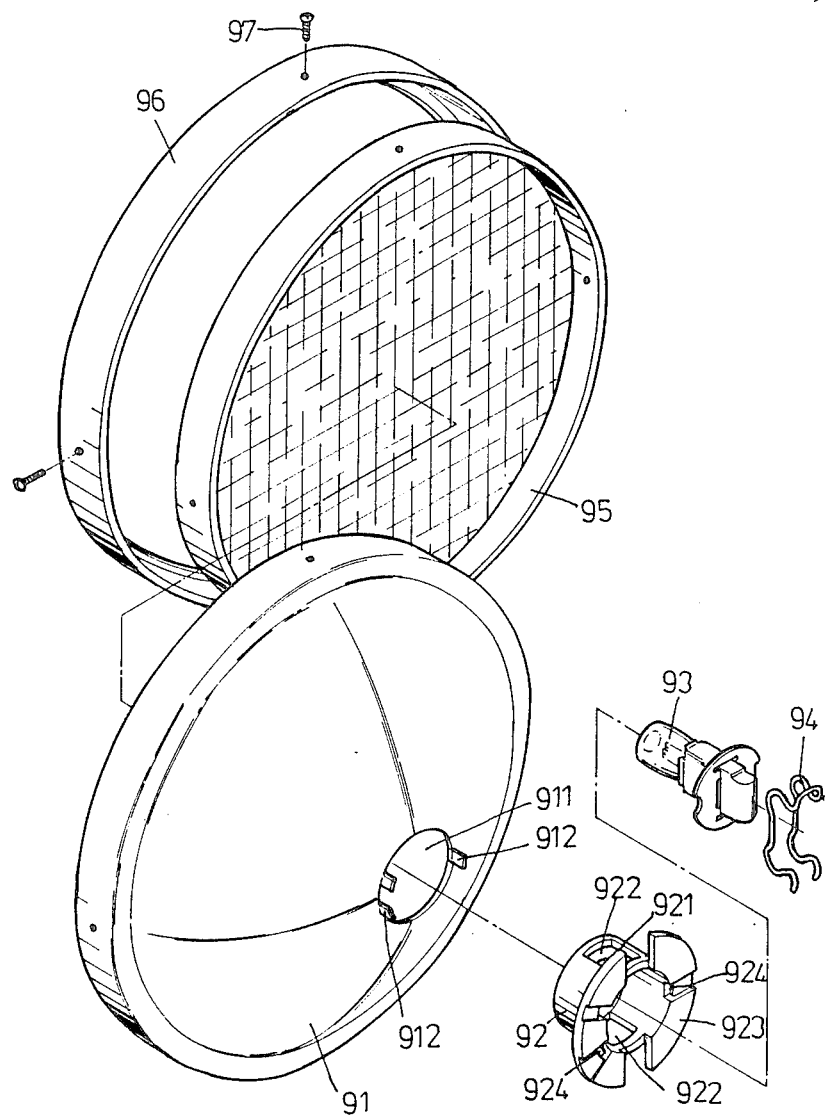
FIG. 10 is an exploded view of a prior art fog light.
Figure 11:
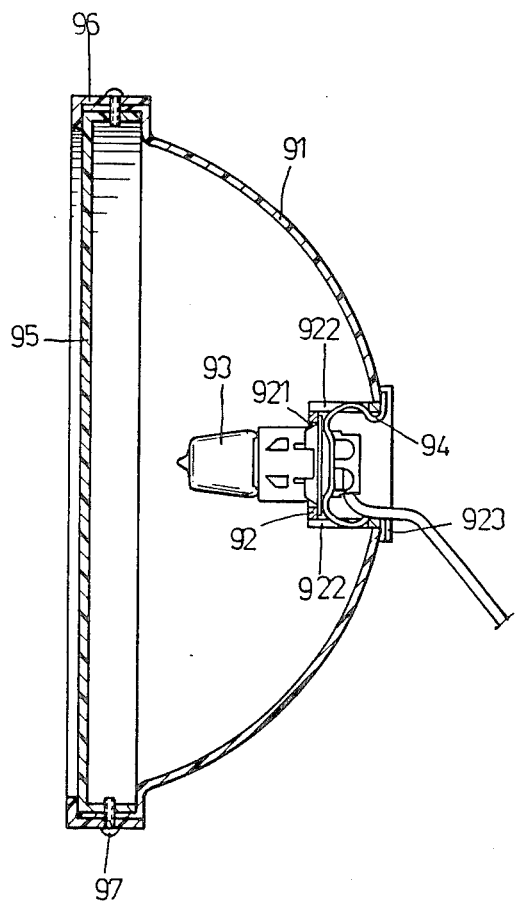
FIG. 11 is a sectional view of the prior art fog light.

Turning now to the drawings wherein like reference characters refer to like and corresponding parts throughout the several views, an embodiment of the auxiliary light for vehicles according to the present invention is shown in FIG. 1. As illustrated, the auxiliary light mainly comprises a housing 1, a mounting 2, a bulb 3, a holder 4, a light concentrator 5, a rubber seal 6, a shade 7, a frame 8 and a movable colored cover 82.

The housing 1 has a generally rectangular open end, a stepped shoulder 11 in the inner side thereof, a spherical reflective surface at the inside bottom thereof, two guideways 121 with a stop edge 122 at the middle of its one inner side for engaging with the mounting 2, and two protuberances 13 at each outer surface of left and right sides for engaging with the frame 8.

The mounting 2, which is made of conducting material, has a bottom plate adapted to be received in the guideways 121 of the housing 1. The bottom plate is provided with a protuberance 21 of the middle of its front part and a packing means 22 at each side of the protuberance 21. The vertical plate of the mounting 2 is narrower than the bottom plate thereof and has a lug 23 at one side for engaging with a terminal 24 connected to a secondary cell (not shown). The upper plate of the mounting 2 is formed with a notch in the front and a positioning projection 25 extending from both sides thereof.

The bulb 3 is mounted on a conducting rectangular stand 31 with its one leg connected to the stand 31 and its the other leg connected to an insulated wire 32. The stand 31 is provided at its outer surface with a circular plate 33 which is also made of conducting material. The circular plate 33 has a notch at both opposite sides thereof.

The holder 4, which is made of resilient materials, has two prongs at the rear portion which are separated by a distance wider than the narrower side of the stand 31. The holder 4 further has two holes 41 and 42 respectively in the bottom and the front plates thereof, a stopper 43 below the hole 42 and two packing plates 44 at each side of the front plate.

The light concentrator 5 is used to concentrate the light from the bulb 3 to the reflective wall of the housing 1. The lower front portion of the light concentrator 5 has a mortise 51 in the center and a lug extending rearwards from both sides.

The rubber seal 6 is generally rectangular in shape and disposed in the stepped shoulder 11 of housing for preventing water from entering therein.

The shade 7 is a transparent member just fitted in the housing 1, bearing against the rubber seal 6.

The frame 8 is provided at its inner side with four mortised 85 (not shown) adapted to corresponding protuberances 13 of the housing 1. On each vertical side of the frame 8 there are three holes 81, 83 and 84.

The movable colored cover 82 is provided in the front with an amber cover 821. At both side of the movable colored hood 82 there is a pin 822 for engaging with a corresponding hole of the frame 8. Furthermore, there is a protuberance 823 at each inner side of the cover 82 so that the protuberance 823 may selectively engage with the hole 83 or hole 84 thereby enabling the hood 82 to be fixed at horizontal or vertical positions.

In assembly, the stand 31 for the bulb 3 is first engaged with the mounting 2, with the notch 34 thereof engaged with the corresponding projection 25 of the mounting 2. Then the lower end of the light concentrator 5 is engaged with the two packing plates 44 of the holder 4 and the tenon 51 of the light concentrator 5 is inserted into the hole 42 of the holder 4. The stopper 43 under the hole 42 of the holder 4 is designed to prevent the light concentrator from moving downwards. The holder 4 is pushed into the mounting 2, with the hole 41 engaged with the protuberance 21 so as to keep the holder 4 in position. The stand is disposed into the two prongs formed at the rear of the holder 42 so that the circular plate 33 thereof will be urged upwards consequently keeping the holder 4 in place. Since the terminal 24 of the mounting 2 is connected to the electrode of a secondary cell and the stand 31, the holder 4 and the circular plate 33 are all made of conducting material, so that electric current can flow through the bulb 3 via the stand 31. The bottom plate of the mounting 2 is slid into the guideways 121 of the housing 1. As the inner edge of the bottom plate of the mounting 2 gets in touch with the stop edge 122 of the housing 1, the two packing plates 22 of the mounting 2 are slid into the guideways 121, fixing the mounting 2 in the housing 1, The rubber seal 6 and the shade 7 are mounted on the stepped shoulder 11 of the housing and then the frame 8 is pressed in the housing 1 with the tenons 85 of the frame 8 engaged with the protuberances 13 of the housing 1. Thereafter, the movable colored cover 82 is put on to the frame 8 so that its protuberances 822 and 823 are respectively engaged with the holes 81 and 84.

When in assembly, the two notches 34 of the circular plate 33 of the stand 31 are just fitted into corresponding postitioning plates 25 provided in the upper plate of the mounting 2 and urged upwards by the prongs of the holder 4. The holder 4 is pressed into the mounting 2 with the prongs thereof embracing the stand 31 and the hole 41 of the holder 4 is engaged with the protuberance 21 of the mounting 2. The lower part of the light concentrator 5 is slid in to the front part of the holder 4 and kept in place by the two packing plates 44 of the holder 4. In the meantime, the tenon 51 of the light concentrator 5 is engaged with the hole 42 of the holder 4. The bottom plate of the mounting 2 is in contact with the stop edge 122 of the housing 1 and the two packing plates 22 of the mounting 2 are slid into the guideways 121 of the housing 1. The hood 7 is confined in place by the frame 8 of which the tenons 85 are engaged with the protuberances 13 formed on two sides of the housing 1.

As stated above, it is not required to use screws, rivets or any other tools to assemble the present invention, which is the first characteristic of the present invention.

Furthermore, the present invention is provided with a movable colored cover 82 which is different from the hood 7 in color and inner surface ripple so that it will have a different dispersion from the shade 7. As a consequence, when the movable cover 7 is moved upwards, the present invention can be used as an auxiliary light, and when the movable cover 7 is disposed vertically, it can be used as a fog light. This feature is a second characteristic of the present invention.

Although this invention has been described with a certain degree of particularity, it is understood that the present disclosure is made by way of example only and that numerous changes in the construction and the combination and arrangement of parts may be resorted to without departing from the spirit and scope of the invention as hereinafter claimed.

I claim:

1. An auxiliary light for vehicle comprising:
    a housing having a generally rectangular open end, a stepped shoulder in the inner side thereof, a spherical reflective surface at the inside bottom thereof, two guideways with a stop edge at the middle of its one inner side and two protuberances of each outer surface of the left and right sides thereof;
    a mounting having a bottom plate adapted be received in the guideways of the housing, said bottom plate being formed with a protuberance of the middle of its front part and a packing means at each side of said protuberance, said mounting having a vertical plate provided with a lug at one side for engaging with a terminal connected to a secondary cell and an upper plate provided with a notch in the front and a positioning projection extending from both sides thereof;
    a bulb mounted on a conducting rectangular stand with one leg thereof connected to the stand and the other leg thereof to an insulated wire 32, said stand having at the outer surface thereof a circular plate formed with a notch at opposite sides thereof;
    a holder formed at the rear portion thereof with two prongs which are separated by a distance wider than a narrower side of said stand, two holes respectively in the bottom and the front plates thereof, a stopper below the lather hole and two packing plates at each side of said front plate;
    a light concentrator for concentrating the light from the bulb to the reflective wall of said housing, said light concentrator having a lower front portion provided with a mortise in the center and a lug extending rearwards from both sides thereof;
    a rubber seal disposed on the stepped shoulder of said housing for preventing water from entering therein;
    a transparent shade just fitted in said housing and bearing against said rubber seal;
    a frame provided of the inner side with four mortises adapted to the corresponding protuberances of said housing and on each vertical side with three holes; and
    a movable colored cover provided in the front surface with an amber cover, on both sides with a pin for engaging with a corresponding hole of the frame, and of each inner side with a protuberance for selectively engaging with one of the two holes of said frame.

* * * * *